US008954567B1

(12) United States Patent
Skvortsov et al.

(10) Patent No.: US 8,954,567 B1
(45) Date of Patent: Feb. 10, 2015

(54) PREDICTING MEDIAPLAN TRAFFIC

(75) Inventors: Evgeny Skvortsov, Kirkland, WA (US); Carl F. Hubinette, Bothell, WA (US)

(73) Assignee: Google Inc, Mountain View, CA (US)

( * ) Notice: Subject to any disclaimer, the term of this patent is extended or adjusted under 35 U.S.C. 154(b) by 846 days.

(21) Appl. No.: 13/171,901

(22) Filed: Jun. 29, 2011

(51) Int. Cl.
*G06F 15/173* (2006.01)
(52) U.S. Cl.
USPC .......................................................... 709/224
(58) Field of Classification Search
CPC ................................................ G06Q 30/0247
USPC .......................................................... 709/224
See application file for complete search history.

(56) References Cited

U.S. PATENT DOCUMENTS

| 7,346,471 B2 | 3/2008 | Chickering et al. |
| 7,593,906 B2 | 9/2009 | Chickering et al. |
| 2006/0053110 A1 | 3/2006 | McDonald et al. |
| 2009/0099904 A1 | 4/2009 | Affeld et al. |

*Primary Examiner* — Joon H Hwang
*Assistant Examiner* — Suraj Joshi
(74) *Attorney, Agent, or Firm* — Armstrong Teasdale LLP

(57) ABSTRACT

Methods, systems, and apparatus for predicting traffic data, including a method comprising: receiving data indicative of traffic data for a mediaplan during first and second time spans, the data representing numbers of unique entities that have interacted with a location during the first and second time spans; and using a function to predict third traffic data during the third time span. The function, when the arbitrary third time span does not exceed the first and second time spans, uses an exponential that includes a difference of dot products using natural logs of combinations of the time spans and first and second traffic data, divided by a difference of natural logs of the first and second time spans. Otherwise, the function uses a difference of dot products using combinations of the time spans and the first and second traffic data, divided by a difference of the first and second time spans.

30 Claims, 5 Drawing Sheets

320 ↘

```
┌─────────────────────────────────────────────────────────────────────┐
│ Identify first traffic data $U_{t_1}$ for a mediaplan $S$ during a  │
│ first time span $t_1$ and second traffic data $U_{t_2}$ for the     │
│ mediaplan $S$ during a second different time span $t_2$, where the  │
│ first time span $t_1$ and the second different time span $t_2$ are  │
│ of substantially different lengths                              322 │
└─────────────────────────────────────────────────────────────────────┘
                                 ↓
┌─────────────────────────────────────────────────────────────────────┐
│ Identify an arbitrary time span $t$ over which predicted traffic    │
│ data is desired to be determined                                324 │
└─────────────────────────────────────────────────────────────────────┘
                                 ↓
┌─────────────────────────────────────────────────────────────────────┐
│ Identify a number of unique entities $U_t$ that visited a           │
│ particular mediaplan in a duration of $t$ days                  326 │
└─────────────────────────────────────────────────────────────────────┘
                                 ↓
┌─────────────────────────────────────────────────────────────────────┐
│ Predict a number of unique entities $U_t(S)$ that satisfy the       │
│ mediaplan $S$ over the arbitrary time span $t$ including using the  │
│ first traffic data $U_{t_1}$ and the second traffic data $U_{t_2}$  │
│ in accordance with a formula                                    328 │
└─────────────────────────────────────────────────────────────────────┘
                                 ↓
┌─────────────────────────────────────────────────────────────────────┐
│ For the arbitrary time span $t$ less than or equal to $t_2$ days,   │
│ use the formula:                                                    │
│                                                                     │
│ $U_t(S) = e^{\frac{\log(U_{t_2}(S))(\log(t)-\log(t_1)) + \log(U_{t_1}(S))(\log(t_2)-\log(t))}{\log(t_2)-\log(t_1)}}$  330 │
└─────────────────────────────────────────────────────────────────────┘
                                 ↓
┌─────────────────────────────────────────────────────────────────────┐
│ For the arbitrary time span $t$ greater than $t_2$ days, use the    │
│ formula:                                                            │
│                                                                     │
│ $U_t(S) = \frac{U_{t_2}(n)(t-t_1) + U_{t_1}(S)(t_2-t)}{t_2-t_1}$ 332│
└─────────────────────────────────────────────────────────────────────┘
```

FIG. 3B

PREDICTING MEDIAPLAN TRAFFIC

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors through an auction. For example, content sponsors can provide bids specifying amounts that the sponsors, respectively, are willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

Traffic data can be collected that represents various types of user interactions with content for different time periods. For example, the number of times that a particular user (or group of users) views a content item, visits a website, views a web page, or performs a specific interaction can each be tracked for different time periods, e.g., ranging from a few minutes or hours to days, weeks, months or years.

SUMMARY

In general, one innovative aspect of the subject matter described in this specification can be implemented in methods that include a method for predicting traffic data, the method comprising: receiving first data indicative of first traffic data for a mediaplan during a first time span and second data indicative of second traffic data for the mediaplan during a second time span, the first and second traffic data representing numbers of unique entities that have interacted with a location during, respectively, the first and second time spans; and using a function derived from the received first and second data and one of an arbitrary number of unique entities or an arbitrary third time span to predict third traffic data representing a number of unique entities interacting with the location during the third time span. The function, when the arbitrary third time span does not exceed the first and second time spans, uses an exponential that includes a difference of dot products using natural logs of combinations of the first, second and arbitrary third time spans and the first and second traffic data, divided by a difference of natural logs of the first and second time spans. Otherwise, the function uses a difference of dot products using combinations of the first, second and arbitrary third time spans and the first and second traffic data, divided by a difference of the first and second time spans.

These and other implementations can each optionally include one or more of the following features. The first and second traffic data can represent measured or estimated points on a graph of time versus unique entities that have interacted with a location, where the graph includes axes in a logarithmic scale. The graph can be presented in a user interface in which a user input of a value corresponding to one of the axes is used to predict a value corresponding to the other one of the axes. The first traffic data can be estimated traffic data. The first traffic data can be measured traffic data. The method can further comprise using the function to estimate a number of unique entities that have interacted with the location for a past arbitrary time period. The method can further comprise using the function to predict a number of unique entities that will interact with the location in a future arbitrary time period. The method can further comprise using the function to estimate a time period in which an arbitrary number of unique entities interacted with the location. The unique entities can be selected from the group comprising unique users, unique households, unique cookies, unique browsers, unique email addresses, and unique IP addresses. The unique entities that have interacted with the location can comprise unique entities that have had interactions with the location where the interactions are selected from the group comprising impressions, clicks, conversions, subscriptions, registrations, web site visits, search queries, database queries and downloads. The first and second time spans can be substantially different in length. The unique entities that have interacted can be determined by cookies. The unique entities that have interacted can be determined by Internet Protocol (IP) addresses. The unique entities can be users that have performed an action at or in association with the location. The location can be a website. Predicting the third data point can include predicting an amount of time required to accumulate a predetermined number of unique entities. Predicting the third data point can include predicting a number of unique entities given a predetermined amount of time.

In general, another innovative aspect of the subject matter described in this specification can be implemented in methods that include a method for predicting traffic data, the method comprising: determining first traffic data for a mediaplan during a first time span and second traffic data for the mediaplan during a second different time span, where the first and second different time spans are of substantially different lengths; identifying an arbitrary time span over which predicted traffic data is desired to be determined; performing a curve fitting on the first traffic data and the second traffic data; and determining the predicted traffic over the arbitrary time span based on the curve fitting.

These and other implementations can each optionally include one or more of the following features. Performing the curve fitting on the first traffic data and the second traffic data can comprise: plotting, on a graph of time versus unique entity numbers, the first traffic data and the second traffic data, producing two points on the graph, where x and y axes of the graph are in a logarithmic scale; and determining the predicted traffic over the arbitrary time span based on the curve fitting comprises: determining a line through the two points; and locating a point of intersection that corresponds to the arbitrary time span on the line, where a value of unique entity numbers at the point of intersection corresponds to the predicted traffic over the arbitrary time span. The mediaplan can be associated with an advertising campaign. Identifying first and second traffic data can include identifying the second traffic data and determining the first traffic data from the identified second traffic data.

In general, another innovative aspect of the subject matter described in this specification can be implemented in methods that include a method for predicting traffic data, the method comprising: identifying first traffic data $U_{r1}$ for a mediaplan S during a first time span $t_1$ and second traffic data $U_{r2}$ for the mediaplan S during a second different time span $t_2$, where the first time span $t_1$ and the second different time span $t_2$ are of substantially different lengths; identifying an arbitrary time span t over which predicted traffic data is desired to be determined; identifying a number of unique entities $U_t$ that visited a particular media-plan in a duration of t days; and predicting a number of unique entities $U_t(S)$ that satisfy the mediaplan S over the arbitrary time span t including using the first traffic data $U_{t1}$ and the second traffic data $U_{t2}$ in accordance with the following formulas.

For the arbitrary time span t less than or equal to $t_2$ days, the formula is:

$$U_t(S) = e^{\frac{\log(U_{t2}(S)) \cdot (\log(t) - \log(t_1)) + \log(U_{t1}(S)) \cdot (\log(t_2) - \log(t))}{\log(t2) - \log(t1)}}$$

For the arbitrary time span t greater than $t_2$ days, the formula is:

$$U_t(S) = \frac{U_{t2}(n) \cdot (t - t_1) + U_{t1}(S) \cdot (t_2 - t)}{t_2 - t_1}$$

These and other implementations can each optionally include one or more of the following features. The mediaplan can be associated with an advertising campaign. The mediaplan can include one or more websites. The unique entities can be selected form the group comprising unique users, unique households, unique cookies, unique browsers, unique email addresses, and unique Internet Protocol (IP) addresses. Identifying first and second traffic data can include retrieving first and second traffic data. Identifying first and second traffic data can include identifying the second traffic data and determining the first traffic data from the identified second traffic data.

In general, another innovative aspect of the subject matter described in this specification can be implemented in a system comprising: a prediction engine that uses prediction models and user traffic data to make predictions comprising predicting a number of unique entities $U_t(S)$ that satisfy a mediaplan S over an arbitrary time span t including using first traffic data $U_{t1}$ during a first time span $t_1$ and second traffic data $U_{t2}$ during a second different time span $t_2$, where the first time span $t_1$ and the second different time span $t_2$ are of substantially different lengths, in accordance with the following formulas.

For the arbitrary time span t less than or equal to $t_2$ days, the formula is:

$$U_t(S) = e^{\frac{\log(U_{t2}(S)) \cdot (\log(t) - \log(t_1)) + \log(U_{t1}(S)) \cdot (\log(t_2) - \log(t))}{\log(t2) - \log(t1)}}$$

For the arbitrary time span t greater than $t_2$ days, the formula is:

$$U_t(S) = \frac{U_{t2}(n) \cdot (t - t_1) + U_{t1}(S) \cdot (t_2 - t)}{t_2 - t_1}$$

In general, another innovative aspect of the subject matter described in this specification can be implemented in a computer program product tangibly embodied in a computer-readable storage device and comprising instructions that, when executed by a processor, perform a method for predicting traffic for a mediaplan, the method comprising: identifying first traffic data $U_{t1}$ for a mediaplan S during a first time span $t_1$ and second traffic data $U_{t2}$ for the mediaplan S during a second different time span $t_2$, where the first time span $t_1$ and the second different time span $t_2$ are of substantially different lengths; identifying an arbitrary time span t over which predicted traffic data is desired to be determined; identifying a number of unique entities $U_t$ that visited a particular mediaplan in a duration of t days; and predicting a number of unique entities $U_t(S)$ that satisfy the mediaplan S over the arbitrary time span t including using the first traffic data $U_{t1}$ and the second traffic data $U_{t2}$ in accordance with the following formulas.

For the arbitrary time span t less than or equal to $t_2$ days, the formula is:

$$U_t(S) = e^{\frac{\log(U_{t2}(S)) \cdot (\log(t) - \log(t_1)) + \log(U_{t1}(S)) \cdot (\log(t_2) - \log(t))}{\log(t2) - \log(t1)}}$$

For the arbitrary time span t greater than $t_2$ days, the formula is:

$$U_t(S) = \frac{U_{t2}(n) \cdot (t - t_1) + U_{t1}(S) \cdot (t_2 - t)}{t_2 - t_1}$$

Particular implementations may realize none, one or more of the following advantages. For example, advertisers who are setting up advertising campaigns can use predictions of user traffic to forecast costs and potential revenues for their campaigns. In another example, predictions of user traffic can be used in media planning, for example, in order to formulate strategies (e.g., including budgets) and/or to select the appropriate media vehicles (e.g., content, including ads) that can be used to reach target audiences, e.g., potential consumers of products and/or services.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B is a flowchart of an example process 320 for using formulas to predict traffic data for a mediaplan.

Like reference numbers and designations in the various drawings indicate like elements.

DETAILED DESCRIPTION

This document describes methods, processes and systems for predicting traffic data for a mediaplan over an arbitrary time span based on traffic data for two time spans having different lengths. For example, the traffic data can represent user interactions (e.g., user actions on the Internet) that are performed and can be aggregated by unique entities such as users, households, cookies, browsers, email addresses, IP addresses, and so on. Interactions that can occur include, for example, impressions, clicks, conversions, subscriptions, registrations, web site visits, page views, search queries, database queries, downloads or any other measures of user interactions with a web site, a content item (e.g., an ad), and so on. As an example, using formulas described in this document, an estimated number of users that can be expected to visit example.com over a three-day period can be predicted from the number of users who visited the same site over seven-day and 28-day periods (or other unequal time periods for which traffic data is known). For example, seven-day and 28-day periods can be used because they are substantially different in length, e.g., the longer time period is at least 20% greater than the shorter time period. Similar formulas can be used to predict, for example, the number of days that N users are expected to visit example.com. In some implementations, other predictions can be made for various combinations of unique entities, interactions and locations.

A mediaplan is a set of resources that can be related in some way. In some implementations, a location can be the subject of a mediaplan. In some implementations, a mediaplan can relate to a collection of sites, URLs, etc. within a domain (e.g., example.com), sub-domains (e.g., news.example.com), all web pages below a particular URL path (e.g., example.com/*) or any combination of web sites, web pages, or other content or resources available on the Internet. As an example, a mediaplan can be a set of ads in an ad campaign.

Figure 1:
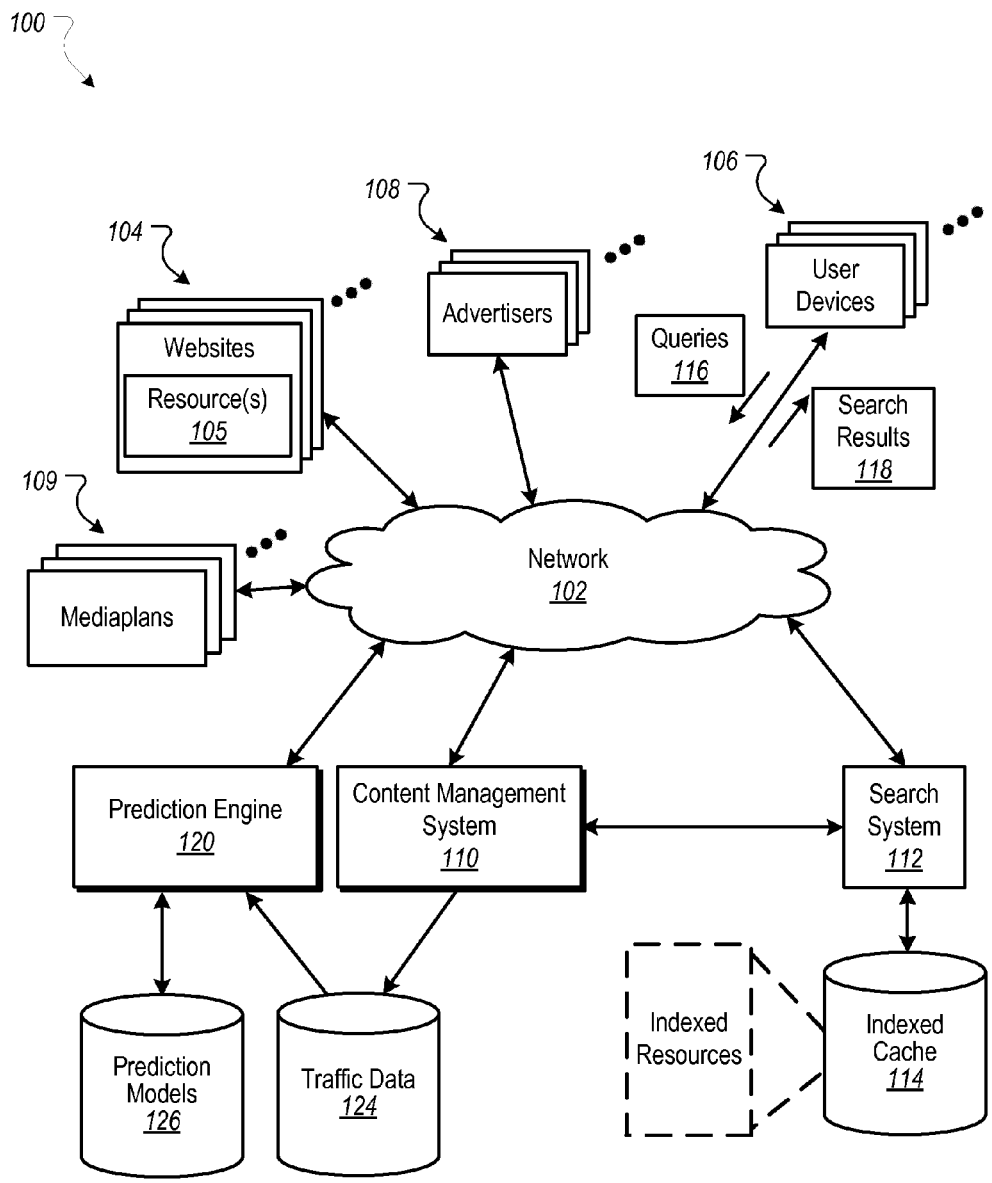
FIG. 1 is a block diagram of an example environment for predicting traffic data for a mediaplan.

FIG. 1 is a block diagram of an example environment 100 for predicting traffic data for a mediaplan. The example environment 100 includes a content management system 110 for selecting and providing content in response to requests for content. In the present example, the content management system 100 also provides predictions for traffic data for a mediaplan as will discussed in greater detail below. The example environment 100 includes a network 102, such as a local area network (LAN), a wide area network (WAN), the Internet, or a combination thereof. The network 102 connects websites 104, user devices 106, content providers (e.g., advertisers 108), publishers 109, and the content management system 110. The example environment 100 may include many thousands of websites 104, user devices 106, advertisers 108 and publishers 109.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114. In some implementations, the search system 112 can be used to provide search results 118 in response to queries 116.

In some implementations, the content management system 110 can track numbers of occurrences of certain user interactions, such as user clicks on a content item, visits to a website, page views, and/or any other measurable interactions by a user or by a group of users. For example, the tracked interactions can represent traffic data for a mediaplan. In some implementations, the traffic data can be stored as traffic data 124, e.g., in a data base or data store that tracks numbers of user interactions over time. For example, the traffic data 124 can store information for different time periods, such as amounts of time (or time intervals) that are a few days long (e.g., seven days) or several weeks (e.g., 28 days).

A prediction engine 120 can make predictions about user traffic for arbitrary time periods based on known traffic data for at least two time periods having different lengths. For example, as described in detail below, the prediction engine 120 can predict the number of entities (e.g., users, groups of users, etc.) who are likely to (or likely did) perform some user interaction, such as visiting a web site or clicking on a content item, to name two examples. For example, based on user traffic information that is known for seven-day and 28-day time periods, predictions can be made for future time periods less than seven days (e.g., three days), more than 28 days, or for time periods between seven and 28 days. Similarly, based on known user traffic information, predictions (e.g., estimates) can be made for past time periods (e.g., "how many users do we think clicked on this content item or visited that web site?"). The predictions can be based at least in part on mathematical formulas, as described in detail below. Further, the predictions can include real-time computations, without having to store traffic data for each individual day of the period under interest.

Prediction models 126 can include the mathematical formulas by which user traffic for arbitrary time periods can be predicted (or estimated, if in the past). In some implementations, the prediction models 126 can include parameters or other information, in addition to the mathematical formulas, to account for special time periods, e.g., time periods that include weekends, holidays, special events (e.g., major sports broadcasts or other media events), or other known factors that can substantially influence user traffic.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, ZIP code, or state level), so that a particular location of a user cannot be determined. In some implementations, opt out features related to social networking systems, for example, can allow the user to specify that the user's activity stream content is not to be used in ads, or to anonymize the information in some way.

Figure 2:
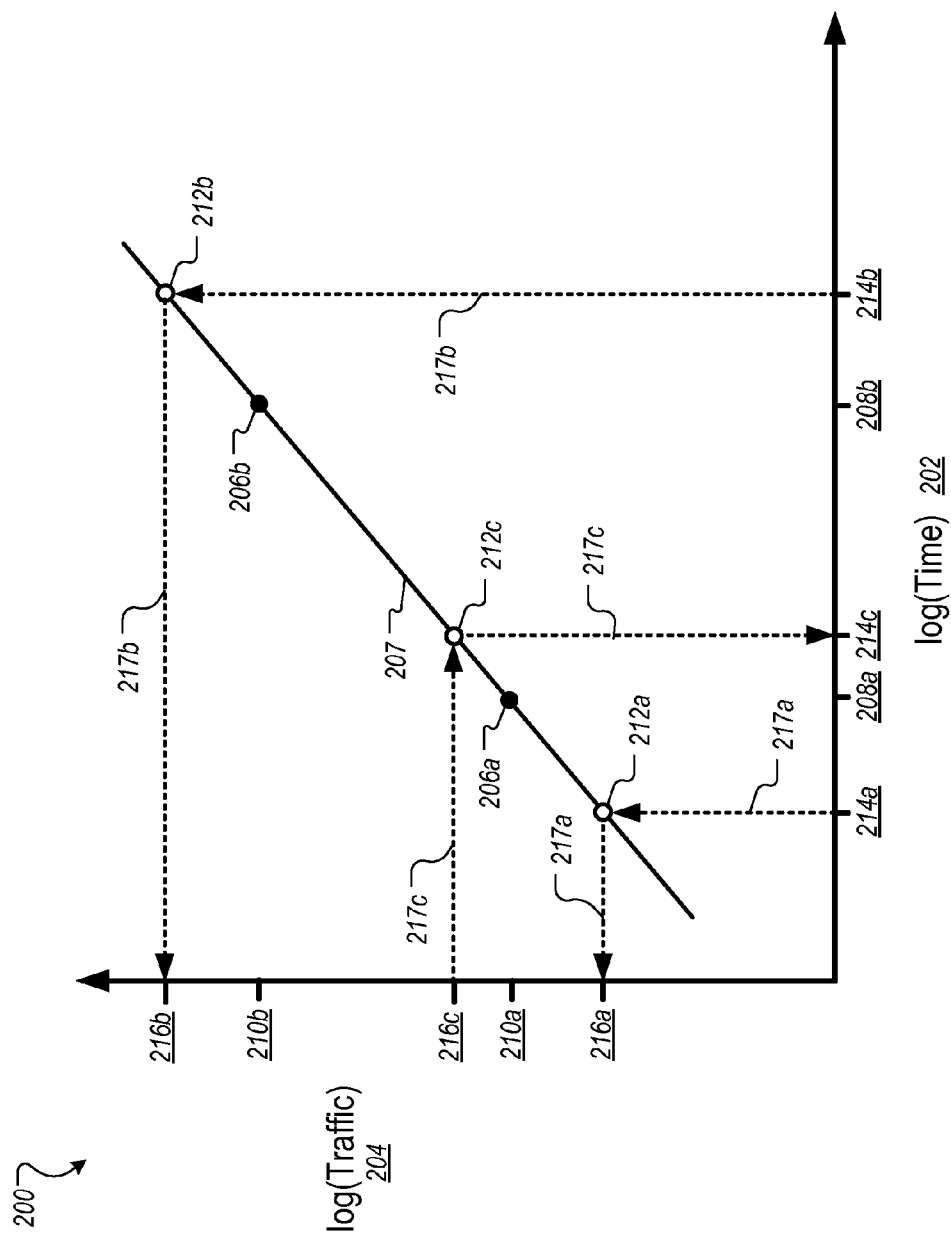
FIG. 2 is a diagram of an example graph for predicting data points.

FIG. 2 is a diagram of an example graph 200 for predicting data points. The graph 200 can represent pictorially the predictions that can be made using various prediction formulas, as described below. In some implementations, the graph 200 can be associated with or represent data stored in memory of one or more computing devices.

The graph 200 has a time axis 202 and an entity traffic axis 204. Both axes 202 and 204 use logarithmic scales. The graph 200 can represent, for example, the number of unique entities (e.g., users) who have visited a location (e.g., a particular web site). For example, the graph 200 can be associated with one or more functions for predicting unique entities that have visited a location for a given time period, as described below. In some implementations, the graph 200 (or data associated with the graph 200) can be presented to a user (e.g., in a user interface) who can provide user input that is used to prompt the prediction engine 120 to predict data points for a location. In some implementations, user input can be provided by manipulating the graph 200, such as by sliding points up and down or left and right. For example, the user interface can accept user input or selection (e.g., on a graph) of a time period, e.g., by selection of a slider control or other control on the graph 200, or by user input of a time period. Then, application code (e.g., the prediction engine 120) associated with the user interface can predict (e.g., using prediction functions described in this document) unique entities for that time period, and the information can be displayed using the graph and/or in a different way. In another example, the user can provide, using the user interface, a number of unique entities for a location, and the user interface can display a corresponding time period that is determined using the prediction functions.

In some implementations, the graph is solely for illustrative purposes and the prediction is performed fully automatically without user involvement. In such implementations, the traffic can be predicted automatically without showing the user any graphs, i.e., without human help in making the predictions. For example, predictions can occur without human intervention after the prediction engine 120 receives an arbitrary time period or a number of unique entities from a user, from the content management system 110, or from some other system.

Example locations include sites (e.g., web sites), resources 105 (e.g., web pages), or any other online location accessible to the user over the network 102. Example unique entities include unique users, unique households, unique cookies, unique browsers, unique email addresses, unique IP addresses, and so on. In some implementations, unique entities can reflect demographic information (e.g., that has been anonymized) including, for example, unique incomes, unique residents (e.g., users or residents of cities, states, or some other named or unnamed geographic area), unique employees (e.g., employee visitors to employers intranet sites), unique hair colors, unique shoe sizes, and so on.

Determining unique entities that have interacted with a location can be done in various ways, e.g., by using cookies to track a user (e.g., anonymized in some way) or by using the IP address associated with a user device 106. In some implementations, identification of a user can be based on user-supplied information, such as resulting from the user registering on a web site and providing a name and/or other personal information. In some implementations, interactions that are determined can include actions performed by (or in association with) a user including, for example, impressions, clicks, conversions, subscriptions, registrations, web site visits, search queries, database queries, downloads or any other measure of user interaction with a web site, a content item (e.g., an ad), and so on.

In some implementations, the predictions that can be made using the graph 200 can be made, for example, after receiving traffic data that corresponds to two different time periods, such as two different time periods that are substantially different in length (e.g., one week and one month). Other time periods can be used, including time periods as short as a few hours, or time periods of two months or more, to name a few examples.

To illustrate an example of how the graph 200 can be used (e.g., conceptually), to predict data points in a mapping or curve-fitting, two or more measured or estimated data points 206a and 206b can be plotted on the graph 200. A line 207 can be drawn or approximated through the data points 206a and 206b that indicates time versus unique entities that have interacted with a location. The data point 206a, for example, represents an amount of time 208a that a number of entities 210a have interacted with a location. Similarly, the data point 206b can represent an amount of time 208b that a number of entities 210b have interacted with the same location. In these examples, the amount of time 208b is greater than the amount of time 208a, and the number of entities 210b is greater than the number of entities 210a. The prediction functions described in this document can achieve similar results as the illustrated example.

In some implementations, curve-fitting, as described above, does not require the generation of an actual graph. In some implementations, a prediction function can be applied that provides for an approximation of data points. In some implementations, other prediction methods are possible, such as regression functions or any other functions that can be used to approximate or predict values. In some implementations, more than two time periods can be used to generate prediction functions.

In some implementations, amounts of time on the graph 200, such as the amounts of time 208a and 208b, can be time periods, including overlapping time periods. For example, the amount of time 208a can be a seven-day time period that may (or may not) overlap with a 28-day time period that is represented by the amount of time 208b. The graph includes two separate points (e.g., data points 206a and 206b) through which a line (e.g., the line 207) can be generated.

Once the line 207 is determined, other data points 212a and 212b on the graph 200 can be predicted for either an arbitrary amount of time or an arbitrary number of unique entities. For example, the predictions can include predicting a corresponding amount of time or a number of unique entities given the other value. Said another way, a value on the entity axis 204 can be predicted from a value on the time axis 202, or vice versa.

As an example, the data point 212a on the line 207 that is directly above an amount of time 214a can be used to predict entity traffic 216a, as shown by arrows 217a. In this example, the amount of time 214a (e.g., three days) is less than the amount of time 208a (e.g., a seven-day period). As a result, the prediction of entity traffic 216a is based on data points 206a and 206b for longer seven-day and 28-day time periods, respectively. Similarly, the data point 212b, for example, on the line 207 that is directly above an amount of time 214b can be used to predict entity traffic 216b, as shown by arrows 217b. In this example, the amount of time 216b (e.g., 31 days) is more than the amount of time 208b (e.g., a 28-day period). As a result, the entity traffic 216b is a predicted amount of entity traffic for a 31-day period. In this example, the prediction is based on the same data points 206a and 206b for seven-day and 28-day time periods, respectively. The same technique can be used to predict other values, including values represented by data points between data points 206a and 206b.

As described above, predictions can be made in other ways, e.g., to predict entity traffic given time, or to predict time based on entity traffic. As an example, the data point 212c on the line 207 that is directly to the right of entity traffic 216c can be used to predict an amount of time 214c, as shown by arrows 217c. This type of prediction, for example, can answer an advertiser's question of how long (e.g., amount of time 214c) it might be expected for a group of users to visit a particular web site the number of times represented by entity traffic 216c.

In some implementations, the graph 200 can represent a process (similar to the previously described examples) for using a function to predict traffic data as follows. First data is received that is indicative of first traffic data for a mediaplan during a first time span. Second data is received that is indicative of second traffic data for the mediaplan during a second time span. The first and second traffic data represent numbers of unique entities that have interacted with a location during, respectively, the first and second time spans. A function is derived from the received first and second data and one of an arbitrary number of unique entities or an arbitrary third time span to predict third traffic data representing a number of unique entities interacting with the location during the third time span.

In some implementations, the function that is used can depend on the length of the arbitrary third time span. For example, when the arbitrary third time span does not exceed the first and second time spans, the function uses an exponential that includes a difference of dot products using natural logs of combinations of the first, second and arbitrary third time spans and the first and second traffic data, divided by a difference of natural logs of the first and second time spans. Otherwise, the function uses a difference of dot products using combinations of the first, second and arbitrary third time spans and the first and second traffic data, divided by a difference of the first and second time spans.

In some implementations, the first and second data can represent measured or estimated points on a graph of time versus unique entities that have interacted with a location, where the graph includes axes in a logarithmic scale, as described above. In some implementations, the graph can be presented in a user interface in which a user input of a value corresponding to one of the axes is used to predict a value corresponding to the other one of the axes.

In some implementations, the first data can be estimated data. In some implementations, the first data can be measured data.

In some implementations, the method can further comprise using the function to estimate a number of unique entities that have interacted with the location for a past arbitrary time period. In some implementations, the method can further comprise using function to predict a number of unique entities that will interact with the location in a future arbitrary time period. In some implementations, the method can further comprise using the function to estimate a time period in which an arbitrary number of unique entities interacted with the location.

In some implementations, the unique entities can be selected from the group comprising unique users, unique households, unique cookies, unique browsers, unique email addresses, and unique IP addresses.

In some implementations, the unique entities that have interacted with the location can comprise unique entities that have had interactions with the location where the interactions are selected from the group comprising impressions, clicks, conversions, subscriptions, registrations, web site visits, search queries, database queries and downloads.

In some implementations, the first and second time spans can be substantially different in length. In some implementations, the first and second time spans can be one week and one month, respectively.

In some implementations, the unique entities that have interacted can be determined by cookies. In some implementations, the unique entities that have interacted can be determined by IP addresses. In some implementations, the unique entities can be users that have performed an action at or in association with the location.

In some implementations, the third data can include predicting an amount of time required to accumulate a predetermined number of unique entities. In some implementations, predicting the third data can include predicting a number of unique entities given a predetermined amount of time.

Figure 3A:
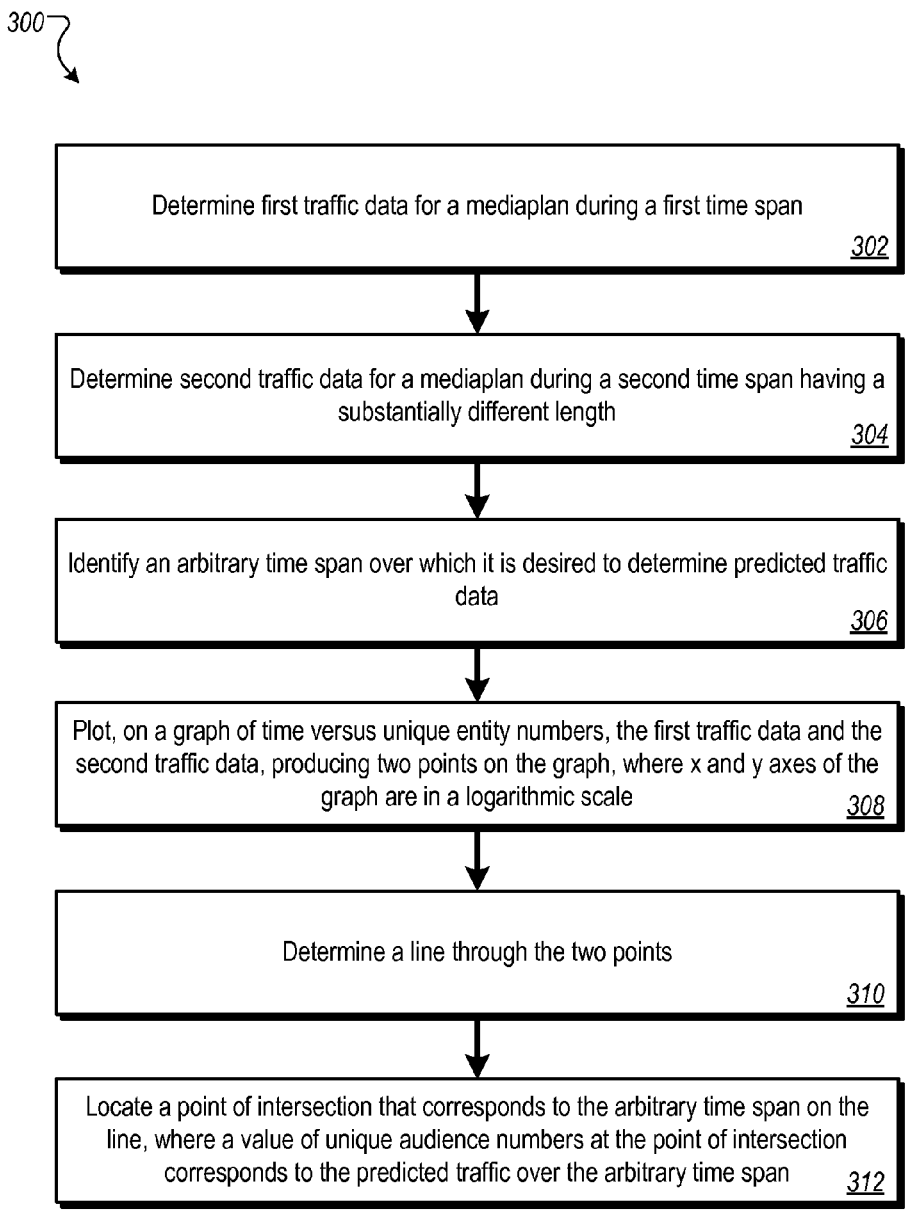
FIG. 3A is a flowchart of an example process 300 for predicting traffic data for a mediaplan.

FIG. 3A is a flowchart of an example process 300 for predicting traffic data for a mediaplan. The process 300 can be performed, for example, by the prediction engine 120. FIGS. 1 and 2 are used to provide examples for steps of the process 300.

First traffic data is determined for a mediaplan during a first time span (302). For example, on the graph 200, the first traffic data that is determined can include the amount of time 208a (e.g., seven days) and the number of entities 210a that have interacted with a location during the amount of time 208a.

Second traffic data is determined for the mediaplan during a second different time span, where the first and second different time spans are of substantially different lengths (304). As an example, on the graph 200, the second traffic data that is determined can include the amount of time 208b (e.g., 28 days) and the number of entities 210b that have interacted with a location during the amount of time 208b.

In some implementations, identifying the first and second traffic data can include retrieving the first and second traffic data from the traffic data 124. In some implementations, the prediction engine 120 can obtain the first and second traffic data in other ways, e.g., as user-supplied inputs to the prediction engine 120.

An arbitrary time span is identified over which it is desired to determine predicted traffic data (306). For example, an advertiser who is creating or updating an advertising campaign may want to predict entity traffic (e.g., user visits to a particular web site) for a particular arbitrary time period (e.g., the amount of time 214a, or three days). As shown on the graph 200, for example, the advertiser may want to predict entity traffic 216a based on the amount of time 214a (e.g., three days). In this example, the values 214a and 216a are represented by the data point 212a, and the location of the data point 212a on the line 207 is what can be used to predict entity traffic 216a.

In some implementations, a mapping (e.g., a curve fitting) can be performed on the first traffic data and the second traffic data, and predicted traffic can be determined over an arbitrary time span based on the mapping. For example, on a graph of time versus unique entity numbers, the first traffic data and the second traffic data are plotted, producing two points on the graph, where x and y axes of the graph are in a logarithmic scale (308). For example, in order for the advertiser to obtain the prediction, at least two data points (e.g., data points 206a and 206b) can be plotted on the graph 200. In some implementations, traffic data representing the data points 206a and 206b can be obtained from the traffic data 124 or provided to the prediction engine 120 in some other way. In this example, the data point 206a corresponds to the amount of time 208a (e.g., seven days) and the number of entities 210a. In this example, the data point 206b corresponds to the amount of time 208b (e.g., 28 days) and the number of entities 210b.

A line through the two points is determined (310). For example, the line 207 that intersects both data points 206a and 206b is determined.

A point of intersection that corresponds to the arbitrary time span is located on the line, where a value of unique entities at the point of intersection corresponds to the predicted traffic over the arbitrary time span (312). As an example, the data point 212a is the point of intersection on the line 207 that is directly above (and corresponds to) the amount of time 214a. In this example, the data point 212a predicts the entity traffic 216a that represents unique entities (e.g., users, audience members, etc.) for the amount of time 214a (e.g., three days). In some implementations, the point of intersection can be determined by the prediction engine 120, e.g., using formulas from the prediction models 126, as will described in detail below.

In another example, a different point of intersection on the line 207 can be used, e.g., to predict unique entities for a different time period. For example, the data point 212b is the point of intersection on the line 207 that is directly above (and corresponds to) the amount of time 214b (e.g., 31 days). In this example, the data point 212b predicts the entity traffic 216b that represents unique entities (e.g., users, audience members, etc.) for the amount of time 214b (e.g., 31 days).

The process 300 can be used to identify first traffic data from second traffic data, or second traffic data from first traffic data, e.g., depending on the prediction needs of the requestor (e.g., advertiser). For example, once the line 207 is determined, the amount of time 214c can be predicted (or estimated) based on entity traffic 216c. This is in addition to determining entity traffic (e.g., entity traffic 216b) based on an amount of time (e.g., amount of time 214b), as described in the previous example.

FIG. 3B is a flowchart of an example process 320 for a mathematical approach to predict traffic data for a mediaplan. The process 320 can be performed, for example, by the prediction engine 120. FIGS. 1 and 2 are used to provide examples for steps of the process 320.

First traffic data $U_{t1}$ is identified for a mediaplan S during a first time span $t_1$ and second traffic data $U_{t2}$ is identified for the mediaplan S during a second different time span $t_2$, where the first and second different time spans are of substantially different lengths (322). For example, the first traffic data $U_{t1}$ can include the amount of time 214a (e.g., seven days) and the corresponding entity traffic 216a, and the second traffic data $U_{t2}$ can include the amount of time 214b (e.g., 28 days) and the corresponding entity traffic 216b.

An arbitrary time span t is identified over which predicted traffic data is desired to be determined (324). For example, the arbitrary time span t can be three days, as represented by the amount of time 214a. The arbitrary time span t can correspond to the time period for which an advertiser wants to predict user traffic on a web site, for example.

A number of unique entities $U_t$ that visited a particular mediaplan in a duration of t days is identified (326). For example, using the line 207 and the data point 212a, the prediction engine 120 can determine entity traffic 216a corresponding to the amount of time 214a.

A number of unique entities $U_t(S)$ that satisfy the mediaplan S over the arbitrary time span t is predicted, including using the first traffic data $U_{t1}$ and second traffic data $U_{t2}$ in accordance with a formula (328). The formula that is used can depend on whether the number of days in the arbitrary time span t is less or more than $t_2$ days (or based on the number of days in the longer of the two time spans in similar formulas using different time spans, e.g., 7 and 28 days).

For the arbitrary time span t less than or equal to $t_2$ days, the following formula can be used (330):

$$U_t(S) = e^{\frac{\log(U_{t2}(S))(\log(t)-\log(t_1))+\log(U_{t1}(S))(\log(t_2)-\log(t))}{\log(t2)-\log(t1)}} \quad (1)$$

For the arbitrary time span t greater than $t_2$ days, the following formula can be used (332):

$$U_t(S) = \frac{U_{t2}(n)(t-t_1) + U_{t1}(S)(t_2-t)}{t_2 - t_1} \quad (2)$$

For example, as a result of using either of the formulas (1) or (2), entity traffic 216a or 216b, respectively, can be predicted. In the preceding example, time spans of seven and 28 days, respectively, are used in the formulas for two different time periods having different lengths. In some implementations, other time spans can be used. In some implementations, the formulas (1) or (2) can be included with the prediction models 126 and executable by the prediction engine 120.

In some implementations, instead of identifying an arbitrary time span t, an arbitrary entity traffic amount (e.g., entity traffic 216c) can be identified (324). Then, formulas (1) or (2) or similar formulas can be used to predict corresponding time spans (e.g., the amount of time 214c) based on the arbitrary entity traffic (e.g., entity traffic 216c).

In another method, a request is received from a user device. The request is to predict traffic data for a mediaplan. The traffic data is predicted using two measured or estimated data points for unique entities that have interacted with a location (e.g., a resource or a site) including traffic data that corresponds to two different time periods. The two different time periods are substantially different in length. In response to the request, the predicted traffic data is provided to the user device for display in a user interface.

In some implementations, the unique entities can be selected from the group comprising unique users, unique households, unique cookies, unique browsers, unique email addresses, and unique IP addresses. In some implementations, the unique entities that have interacted with the location can comprise unique entities that have had interactions with the location where the interactions are selected from the group comprising impressions, clicks, conversions, subscriptions, registrations, web site visits, search queries, database queries and downloads.

In some implementations, the two different time periods are one week and one month, respectively. In some implementations, the unique entities that have interacted with the location are determined by cookies. In some implementations, the unique entities that have interacted with the location are determined by IP addresses. In some implementations, the unique entities are users that have performed an action at, or in association with, the location.

Figure 4:
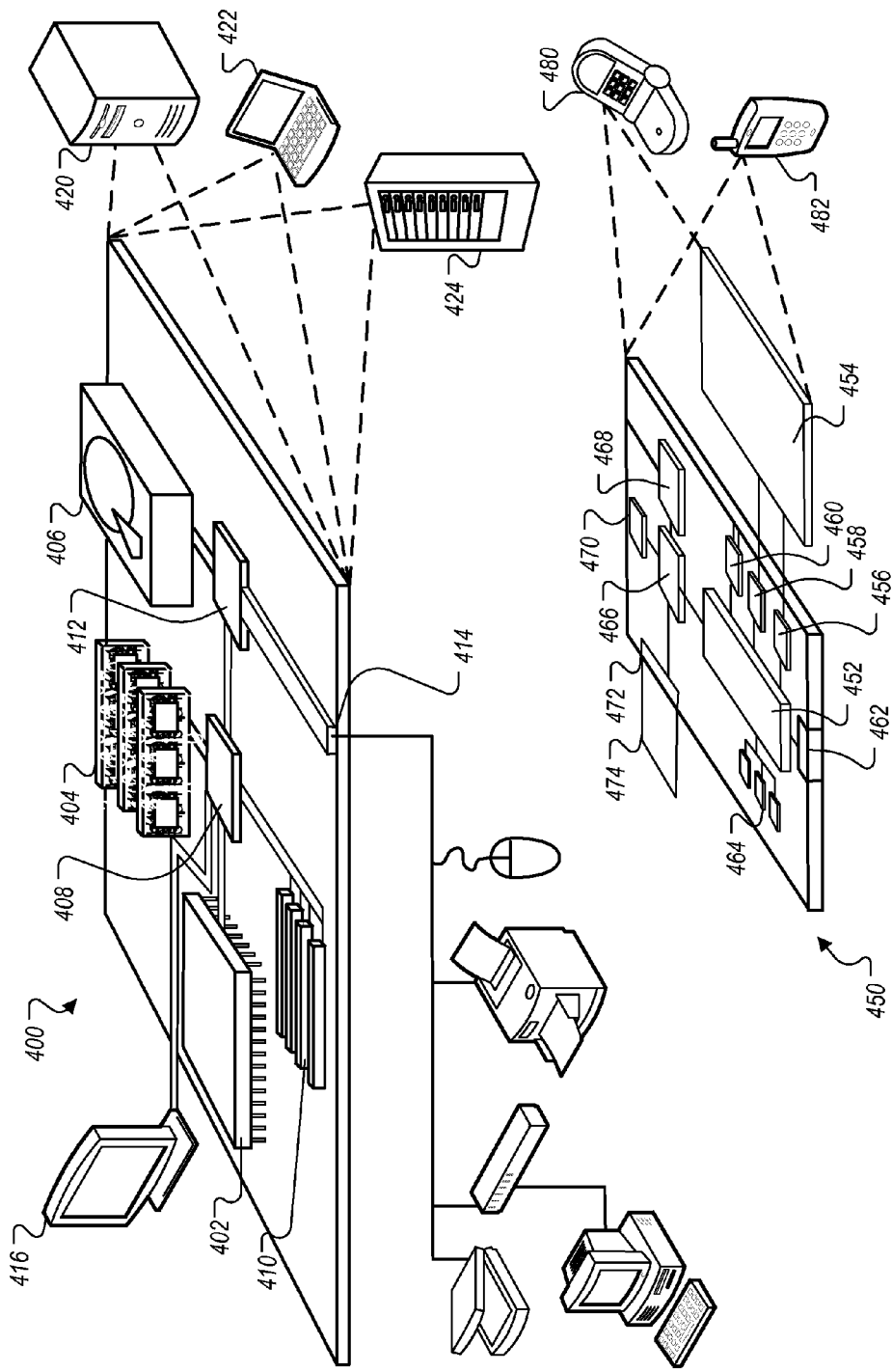
FIG. 4 is block diagram of an example computer system that can be used to implement the methods, systems and processes described in this disclosure.

FIG. 4 is a block diagram of computing devices 400, 450 that may be used to implement the systems and methods described in this document, as either a client or as a server or a plurality of servers. The computing device 400 is intended to represent various forms of digital computers, such as laptops, desktops, workstations, personal digital assistants, servers, blade servers, mainframes, and other appropriate computers. The computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 400 includes a processor 402, memory 404, a storage device 406, a high-speed interface 408 connecting to the memory 404 and high-speed expansion ports 410, and a low speed interface 412 connecting to a low speed bus 414 and a storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to the high-speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on the processor 402.

The high-speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to the memory 404, the display 416 (e.g., through a graphics processor or accelerator), and to the high-speed expansion ports 410, which may accept various expansion cards (not shown). In the implementation, the low-speed controller 412 is coupled to the storage device 406 and the low-speed expansion port 414. The low-speed expansion port 414, which may include various communication ports (e.g., USB, Bluetooth™, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from the computing device 400 may be combined with other components in a mobile device (not shown), such as the device 450. Each of such devices may contain one or more of the computing devices 400, 450, and an entire system may be made up of multiple computing devices 400, 450 communicating with each other.

The computing device 450 includes a processor 452, a memory 464, an input/output device such as a display 454, a communication interface 466, and a radio-frequency transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by the device 450, and wireless communication by the device 450.

The processor 452 may communicate with a user through the control interface 458 and the display interface 456 coupled to the display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with the processor 452, so as to enable near area communication of the device 450 with other devices. The external interface 462 may provide, for example, for wired communication (e.g., via a docking procedure) or for wireless communication (e.g., via Bluetooth™ or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to the device 450 through the expansion interface 472, which may include, for example, a SIMM card interface. Such expansion memory 474 may provide extra storage space for the device 450, or may also store applications or other information for the device 450. Specifically, the expansion memory 474 may include instructions to carry out or supplement the processes described above, and may include secure information also. Thus, for example, the expansion memory 474 may be provide as a security module for the device 450, and may be programmed with instructions that permit secure use of the device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, the expansion memory 474, or the memory on the processor 452.

The device 450 may communicate wirelessly through the communication interface 466, which may include digital signal processing circuitry where necessary. The communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through the radio-frequency transceiver 468. In addition, short-range communication may occur, such as using a Bluetooth™, WiFi, or other such transceiver (not shown). In addition, a GPS receiver module 470 may provide additional wireless data to the device 450, which may be used as appropriate by applications running on the device 450.

The device 450 may also communicate audibly using audio codec 460, which may receive spoken information from a user and convert it to usable digital information. The audio codec 460 may likewise generate audible sound for a user, such as through a speaker, e.g., in a handset of the device 450. Such sound may include sound from voice telephone calls, may include recorded sound (e.g., voice messages, music files, etc.) and may also include sound generated by applications operating on the device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, by a traffic data store, first data indicative of first traffic data for a mediaplan during a first time span and second data indicative of second traffic data for the mediaplan during a second time span, the first and second traffic data representing numbers of unique entities that have interacted with a location during, respectively, the first and second time spans;
using, by a prediction engine, a function derived from at least one of data received from a user device, the received first data, and the received second data and one of an arbitrary number of unique entities or an arbitrary third time span to predict third traffic data representing a number of unique entities interacting with the location during the third time span; and
outputting the prediction of third traffic data to the mediaplan, the mediaplan associated with at least one of an advertising campaign and a media strategy;
where the function, when the arbitrary third time span does not exceed the first and second time spans, uses an exponential that includes a difference of dot products using natural logs of combinations of the first, second and arbitrary third time spans and the first and second traffic data, divided by a difference of natural logs of the first and second time spans; and
where the function otherwise uses a difference of dot products using combinations of the first, second and arbitrary third time spans and the first and second traffic data, divided by a difference of the first and second time spans.

2. The method of claim 1 where the first and second traffic data represent measured or estimated points on a graph of time versus unique entities that have interacted with a location, where the graph includes axes in a logarithmic scale.

3. The method of claim 2 where the graph is presented in a user interface in which a user input of a value corresponding to one of the axes is used to predict a value corresponding to the other one of the axes.

4. The method of claim 1 where the first traffic data is estimated traffic data.

5. The method of claim 1 where the first traffic data is measured traffic data.

6. The method of claim 1 further comprising using the function to estimate a number of unique entities that have interacted with the location for a past arbitrary time period.

7. The method of claim 1 further comprising using the function to predict a number of unique entities that will interact with the location in a future arbitrary time period.

8. The method of claim 1 further comprising using the function to estimate a time period in which an arbitrary number of unique entities interacted with the location.

9. The method of claim 1 where unique entities are selected from the group comprising unique users, unique households, unique cookies, unique browsers, unique email addresses, and unique IP addresses.

10. The method of claim 1 where unique entities that have interacted with the location comprises unique entities that have had interactions with the location where the interactions are selected from the group comprising impressions, clicks, conversions, subscriptions, registrations, web site visits, search queries, database queries and downloads.

11. The method of claim 1 where the first and second time spans are substantially different in length.

12. The method of claim 1 where the unique entities that have interacted are determined by cookies.

13. The method of claim 1 where the unique entities that have interacted are determined by Internet Protocol (IP) addresses.

14. The method of claim 1 where the unique entities are users that have performed an action at or in association with the location.

15. The method of claim 1 where the location is a website.

16. The method of claim 1 where predicting the third data point includes predicting an amount of time required to accumulate a predetermined number of unique entities.

17. The method of claim 1 where predicting the third data point includes predicting a number of unique entities given a predetermined amount of time.

18. A method comprising:
determining first traffic data for a mediaplan during a first time span and second traffic data for the mediaplan during a second different time span, where the first and second different time spans are of substantially different lengths;
storing at least one of the first traffic data and the second traffic data in a traffic data store;
identifying an arbitrary time span over which predicted traffic data is desired to be determined;
receiving, by a prediction engine, at least one of data received from a user device, the stored first traffic data, and the second traffic data;
performing a curve fitting on the first traffic data and the second traffic data;
determining, by a prediction engine, the predicted traffic over the arbitrary time span based on the curve fitting; and
outputting the predicted traffic to the mediaplan, the mediaplan associated with at least one of an advertising campaign and a media strategy.

19. The method of claim 18 where:
performing the curve fitting on the first traffic data and the second traffic data comprises plotting, on a graph of time versus unique entity numbers, the first traffic data and the second traffic data, producing two points on the graph, where x and y axes of the graph are in a logarithmic scale; and
determining the predicted traffic over the arbitrary time span based on the curve fitting comprises: determining a line through the two points; and locating a point of intersection that corresponds to the arbitrary time span on the line, where a value of unique entity numbers at the point of intersection corresponds to the predicted traffic over the arbitrary time span.

20. The method of claim 18 where the mediaplan is associated with an advertising campaign.

21. The method of claim 18 where the mediaplan includes one or more websites.

22. The method of claim 18 where identifying first and second traffic data includes identifying the second traffic data and determining the first traffic data from the identified second traffic data.

23. A method comprising:
receiving traffic data at a traffic data store,
identifying, using the stored traffic data, first traffic data $U_{t1}$ for a mediaplan S during a first time span $t_1$ and second traffic data $U_{t2}$ for the mediaplan S during a second different time span $t_2$, where the first time span $t_1$ and the second different time span $t_2$ are of substantially different lengths;

identifying an arbitrary time span t over which predicted traffic data is desired to be determined;

identifying a number of unique entities $U_t$ that visited a particular media-plan in a duration of t days;

predicting a number of unique entities $U_t(S)$ that satisfy the mediaplan S over the arbitrary time span t including using the first traffic data $U_{t1}$ and the second traffic data $U_{t2}$ in accordance with the following formulas:

for the arbitrary time span t less than or equal to $t_2$ days:

$$U_t(S) = e^{\frac{log(U_{t2}(S)) \cdot (log(t) - log(t_1)) + log(U_{t1}(S)) \cdot (log(t_2) - log(t))}{log(t2) - log(t1)}};$$

and
for the arbitrary time span t greater than $t_2$ days:

$$U_t(S) = \frac{U_{t2}(n) \cdot (t - t_1) + U_{t1}(S) \cdot (t_2 - t)}{t_2 - t_1};$$

and
outputting the predicted number of unique entities that satisfy the mediaplan, the mediaplan associated with at least one of an advertising campaign and a media strategy.

24. The method of claim 23 where the mediaplan is associated with an advertising campaign.

25. The method of claim 23 where the mediaplan includes one or more websites.

26. The method of claim 23 where the unique entities are selected form the group comprising unique users, unique households, unique cookies, unique browsers, unique email addresses, and unique Internet Protocol (IP) addresses.

27. The method of claim 23 where identifying first and second traffic data includes retrieving first and second traffic data.

28. The method of claim 23 where identifying first and second traffic data includes identifying the second traffic data and determining the first traffic data from the identified second traffic data.

29. A system comprising:
one or more processors communicatively coupled to a memory;
one or more non-transitory computer-readable storage media configured to store instructions executable by said one or more processors;
a prediction engine that uses prediction models stored in the storage media and transmitted to the memory for execution by said one or more processors and user traffic data to make predictions comprising predicting a number of unique entities $U_t(S)$ that satisfy a mediaplan S over an arbitrary time span t including using first traffic data $U_{t1}$ during a first time span $t_1$ and second traffic data $U_{t2}$ during a second different time span $t_2$, where the first time span $t_1$ and the second different time span $t_2$ are of substantially different lengths, in accordance with the following formulas:

for the arbitrary time span t less than or equal to $t_2$ days:

$$U_t(S) = e^{\frac{log(U_{t2}(S)) \cdot (log(t) - log(t_1)) + log(U_{t1}(S)) \cdot (log(t_2) - log(t))}{log(t2) - log(t1)}};$$

and
for the arbitrary time span t greater than $t_2$ days:

$$U_t(S) = \frac{U_{t2}(n) \cdot (t - t_1) + U_{t1}(S) \cdot (t_2 - t)}{t_2 - t_1};$$

and
outputting the prediction of the number of unique entities that satisfy the mediaplan to the mediaplan, the mediaplan associated with at least one of an advertising campaign and a media strategy.

30. A computer program product tangibly embodied in a non-transitory computer-readable storage device and comprising instructions that, when executed by one or more processors, perform a method for predicting traffic for a mediaplan, the method comprising:
identifying first traffic data $U_{t1}$ for a mediaplan S during a first time span $t_1$ and second traffic data $U_{t2}$ for the mediaplan S during a second different time span $t_2$, where the first time span $t_1$ and the second different time span $t_2$ are of substantially different lengths;
identifying an arbitrary time span t over which predicted traffic data is desired to be determined;
identifying a number of unique entities $U_t$ that visited a particular media-plan in a duration of t days; and
predicting, by a prediction engine, a number of unique entities $U_t(S)$ that satisfy the mediaplan S over the arbitrary time span t including using the first traffic data $U_{t1}$ and the second traffic data $U_{t2}$ in accordance with the following formulas:

for the arbitrary time span t less than or equal to $t_2$ days:

$$U_t(S) = e^{\frac{log(U_{t2}(S)) \cdot (log(t) - log(t_1)) + log(U_{t1}(S)) \cdot (log(t_2) - log(t))}{log(t2) - log(t1)}};$$

and
for the arbitrary time span t greater than $t_2$ days:

$$U_t(S) = \frac{U_{t2}(n) \cdot (t - t_1) + U_{t1}(S) \cdot (t_2 - t)}{t_2 - t_1};$$

and
outputting the prediction of the number of unique entities that satisfy the mediaplan to the mediaplan, the mediaplan associated with at least one of an advertising campaign and a media strategy.

* * * * *